Figure 1:
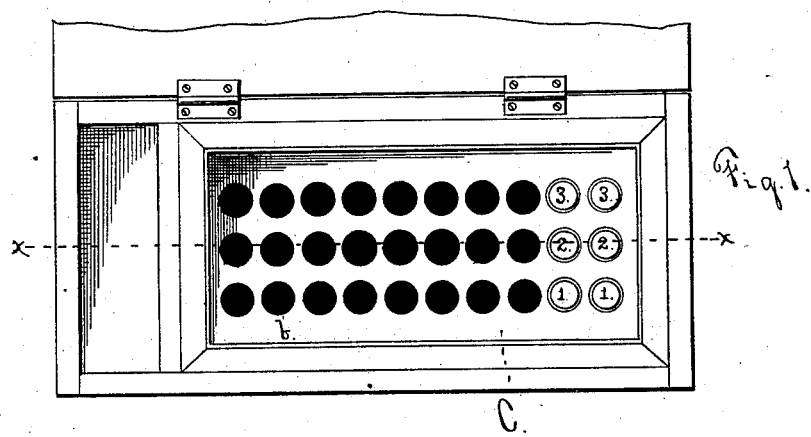

(No Model.)

N. S. ANDREWS & J. M. BURNAP.
DEVICE FOR TESTING CREAM.

No. 316,860. Patented Apr. 28, 1885.

Attest,
N. N. Clark
M. J. Clagett

Inventor:
Nathaniel S. Andrews
James M. Burnap
by Geo. W. Dyer
Att'y.

UNITED STATES PATENT OFFICE.

NATHANIEL S. ANDREWS AND JAMES M. BURNAP, OF ZWINGLE, ASSIGNORS OF ONE-THIRD TO HIRAM F. BURNAP, OF JACKSON COUNTY, IOWA.

DEVICE FOR TESTING CREAM.

SPECIFICATION forming part of Letters Patent No. 316,860, dated April 28, 1885.

Application filed April 4, 1883. (No model.)

*To all whom it may concern:*

Be it known that we, NATHANIEL S. ANDREWS and JAMES M. BURNAP, of Zwingle, in the county of Dubuque and State of Iowa, have invented a new and improved Device for Testing Cream; and we do hereby declare that the following is a full and exact description of the same, reference being had to the accompanying drawings, and to the letters of reference marked thereon.

Our invention relates to an improved apparatus for testing the quality, and consequently the value, of cream to be used in the manufacture of butter.

The object of the invention is to protect both the farmers or dealers in cream and the manufacturers of butter.

Heretofore it has been the custom for each manufacturer to send an agent to the different dairymen in his vicinity for the purpose of collecting the cream held for sale by said dairymen. This agent or collector was provided with a graduated pail or receptacle of such a size that an inch of cream, if pure, or nearly so, as measured in said receptacle, would produce a pound of butter, and he would purchase the cream by the inch, the price of butter regulating the price to be paid for the cream. When this custom was first inaugurated, the farmers or dairymen were allowed to prepare the cream for sale; but it was soon discovered that they, either through carelessness or dishonesty, would have a certain quantity of milk with the cream, and in some instances it was discovered that a short time before the visit of the collector they would mix the cream and skimmed milk, causing it to appear like pure cream, or that they would mix soda with it in order to make the cream foam, in which last-named instance an inch of cream, as measured in the collector's vessel, would not produce more than three-fourths or one-half pound of butter. In order to protect themselves from these frauds, the manufacturers of butter inaugurated the custom of having the agent or collector do the skimming before buying; but this was soon found to be slow and inconvenient, inasmuch as it became impossible for the collector to visit more than about twenty dairymen a day, and in cold weather the manufacturers found that such a small amount of cream could be collected that it would be better to discontinue the business until spring, or until warmer weather set in, and this has accordingly been done. Another great disadvantage in this system arose from the fact that the milk skimmed early in the morning would not produce as much butter to the inch as that skimmed in the evening, owing to which fact the farmer whose cream was purchased in the morning received more in proportion for his cream than those visited in the evening. To avoid all these delays and inconveniences and at the same time to insure fair dealings between the manufacturers and the dairymen, we have invented the apparatus as will be fully hereinafter described and claimed.

For the better understanding of the invention, and to enable those skilled in the art to use the same, reference will be made to the accompanying drawings, which form part of this specification, and in which—

Figures 2, 3:
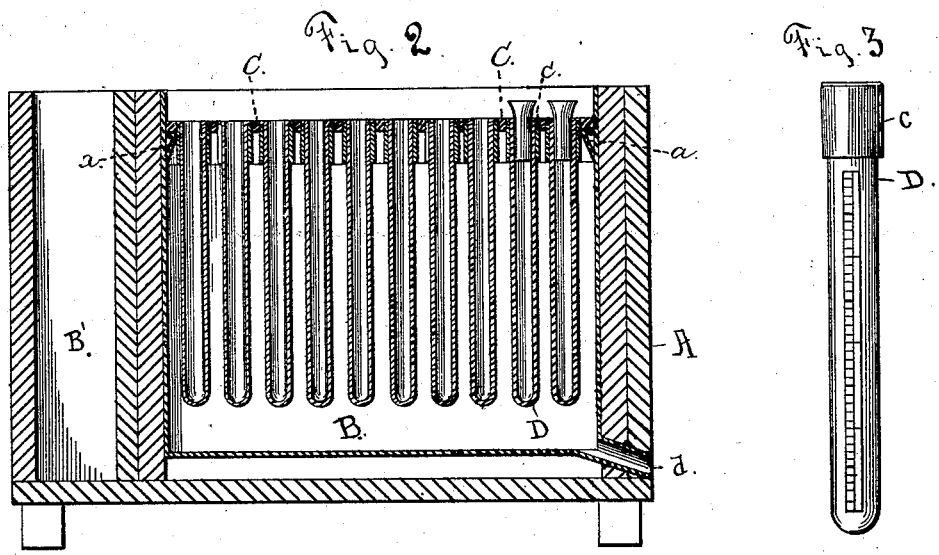

Figure 1 is a top plan view of the apparatus employed, with the top or cover removed; Fig. 2, a vertical section of the same on line *x x*, Fig. 1; and Fig. 3 a detail view.

Like letters refer to corresponding parts in the several views.

We will first describe our improved apparatus and afterward show how it may be successfully and advantageously employed in the business of collecting cream for the manufacture of butter.

It consists of a box, A, preferably about two or three feet in length, ten inches in width, and about ten or twelve inches in depth. This box is provided with any suitable cover hinged in any ordinary manner, and is divided into two compartments, B and B'. The compartment B, which includes the larger portion of the interior of this box, is lined with zinc or any other water-proof material. Near the top of this lining, a flange or shoulder, *a*, is formed, said flange extending entirely around the compartment B, and serving as a rest or support for a follow-board, C. This follow-board is lined on its under side with zinc or other water-proof material, and is provided with a number of holes or openings, *b*, these holes passing through said board. Through these holes *b* graduated bottles D are passed, the construction of these bottles and their position in the board C being clearly shown in Figs. 2 and 3. As shown in Fig. 3, they have round bottoms, and have passed around their necks a rubber band, c, which serves to hold them securely in position when inserted through the holes in board C, into which they will fit tightly, and the board C being about three-fourths of an inch thick, these bottles will be prevented from striking against each other. They are preferably about six inches in length, and are provided with a graduated scale, as shown, said scale being divided into tenths or twentieths of an inch. These bottles are provided with ordinary corks upon the upper faces of which are clearly marked the number of the different bottles. The compartment B', before referred to, includes but a small portion of the interior of box A, and is to be used as a receptacle for money and the collector's account-book, this book to be referred to hereinafter. It will be apparent that this compartment B' may be omitted and the entire box used for the bottles; but when the box is of a size to allow it the construction first described is preferred.

In warm weather it is found necessary to keep the cream in bottles D cool, and to accomplish this we fill compartment B below the follow-board C with cold water, said compartment being provided at a suitable point near its bottom with an opening, d, through which the water in compartment B escapes when it is desired to empty said compartment. This opening is closed by a suitable plug when the water is to be retained in the box.

In place of the water above mentioned it may be found advantageous to use ice, in which case the box would be made slightly larger than described and a quantity of ice is sunk in the center of the water and held in any desirable manner.

In cold weather it will prove advantageous to keep the cream in bottles D in a slightly-heated condition, in which case warm water would be placed in compartment B in place of the cold water previously referred to. The object is to have the cream placed in a receptacle where the temperature is about the same as that of the place where it was at first kept; this is found necessary to prevent the cream from becoming sour, in which case the milk and cream would not separate.

The manufacturer's collector starts on his rounds with his box filled with empty bottles, the number of bottles being determined by the number of dairymen to be visited. These bottles are either marked in duplicate—i. e., there are two bottles numbered 1, two numbered 2, &c.—or the bottles in the box are numbered 1, 2, 3, &c., and the collector carries other bottles with similar numbers. The collector is also provided with a pail of a given size, an inch of cream as measured in said pail being sufficient for the manufacture of a pound of butter. He is also provided with a rule or measure marked in tenths, the use of which will be described. Upon reaching the first dairyman, who has been notified of his visit and who has his cream prepared for sale, he takes this cream and places it in the pail referred to, and having done this he inserts his rule and determines the exact amount of cream offered for sale, which amount he enters upon his book and then he stirs said cream thoroughly. Having ascertained the quantity of cream, he places an equal amount in each of the bottles marked 1, one of which bottles thus filled he replaces in his box, and the other he leaves with the dairyman, having first made a memorandum in his account-book of the whole amount of cream held for sale by the dairyman, as above referred to. This done, he then visits the next dairyman, with whom he repeats the operation just described, filling bottles 2 2, and leaving one with the dairyman and placing the other in his box, this being continued until he has filled all his bottles, or until he has visited all the dairymen he can for the day. He then returns to the factory with his bottles filled with cream, and these he hangs up in a warm or cool place, according to the weather, and he allows them to remain perfectly quiet so that the cream will rise until a certain time the following day, say until ten o'clock a. m. At the stated time he examines each bottle carefully in order to ascertain exactly how much per cent. he must deduct from the cream. As an example: Supposing the contents of bottle number 1 consist of four inches of cream and one inch of milk, the dairymen from whom it was purchased will be docked twenty per cent., &c. The quantity of milk thus found in each bottle is entered in the collector's account-book opposite the entry previously made as to the amount collected from the dairyman with whom the duplicate bottle had been left.

It will be readily understood that if the cream has been thoroughly stirred by the collector when first obtained from the dairyman the proportion of cream and milk will be the same in both the bottle retained by the collector and that left with the dairyman. The dairyman examines the contents of the bottle left with him and upon the next visit of the collector they compare notes and decide upon the amount to be paid; or, if preferred, the dairyman can postpone the examination of his bottle until the collector arrives. Upon the second visit of the collector, and after the examination of the bottle left the previous day, the contents of said bottle are emptied by the collector and the operation of the previous day repeated.

With our improved apparatus both the manufacturer and the dairyman are protected. The manufacturer is protected because he has every opportunity of discovering the exact amount of pure cream he is buying, and for the reason that if the dairyman is careless enough to allow milk to be mixed with the cream, this carelessness will be discovered and the dairyman be the only sufferer. On the other hand, the dairyman is thoroughly protected from any unjust measurement by the collector, for the reason that he is allowed to measure the cream himself and has the opportunity of examining the records of the factory to see that the collector is perfectly truthful.

We are aware of the fact that Letters Patent of Dietschey, No. 54,306, of May 1, 1866, describe a liquor-cooler with a central perforated ice-cylinder surrounded near its top by a horizontal perforated plate for holding the bottles; and we are also aware of the fact that Letters Patent of Jones, No. 133,990, of December 17, 1872, describe rubber gaskets or rings secured to a board around openings made therein to receive the bottles, and therefore lay no claim to such constructions or arrangements; but,

Having thus fully described our apparatus, what we claim as new, and that for which we desire to secure Letters Patent, is—

In an apparatus for testing cream, the box or receptacle A, lined with water-proof material and having an unobstructed interior that may be heated or cooled, and provided on its sides with shoulders $a\ a$, the follow-board C, lined on its under side with water-proof material and provided with perforations over its entire surface and extending unbrokenly across the interior of the box or receptacle, and the graduated bottles D, placed in said follow-board and having each a rubber band, $c$, encircling its neck, all constructed and combined substantially as described.

In testimony whereof we affix our signatures in presence of two witnesses.

NATHANIEL S. ANDREWS.
JAMES M. BURNAP.

Witnesses:
MONROE M. CADY.
H. BURNAP.